United States Patent
Fujii et al.

(10) Patent No.: US 9,948,220 B2
(45) Date of Patent: Apr. 17, 2018

(54) ROTATION ANGLE ESTIMATION APPARATUS FOR ROTATING ELECTRIC MACHINE

(71) Applicant: DENSO CORPORATION, Kariya, Aichi-pref. (JP)

(72) Inventors: Kiyoshi Fujii, Kariya (JP); Atsuyuki Hiruma, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 15/653,992

(22) Filed: Jul. 19, 2017

(65) Prior Publication Data
US 2018/0026559 A1    Jan. 25, 2018

(30) Foreign Application Priority Data

Jul. 22, 2016  (JP) .................................. 2016-144325

(51) Int. Cl.
*H02P 21/00* (2016.01)
*H02P 6/185* (2016.01)
(Continued)

(52) U.S. Cl.
CPC ................ *H02P 6/185* (2013.01); *H02P 6/18* (2013.01); *H02P 21/26* (2016.02);
(Continued)

(58) Field of Classification Search
CPC .... H02P 1/00; H02P 21/00; H02P 3/00; H02P 6/00; H02P 23/00; H02P 25/00; G05B 11/28
(Continued)

(56) References Cited

U.S. PATENT DOCUMENTS 7,443,130 B2 * 10/2008 Takao ..................... H02P 21/14
                                                     318/720
7,482,777 B2 *  1/2009 Tomigashi ................ H02P 6/18
                                                    318/400.02

(Continued)

FOREIGN PATENT DOCUMENTS

JP        2004-032908 A      1/2004
JP        2005-151640 A      6/2005
(Continued)

OTHER PUBLICATIONS

Jung et al., "An Adjusted Current Control System for Signal-injection-based Position Sensorless Control and Parameter Identification," IEEJ Transactions on Industry Applications, vol. 132 No. 3, pp. 418-425.

*Primary Examiner* — Antony M Paul
(74) *Attorney, Agent, or Firm* — Oliff PLC

(57) ABSTRACT

A rotation angle estimation apparatus includes: a high-frequency voltage setting unit that sets high-frequency voltages; a circuit operating unit that operates an electric power conversion circuit to apply each of the high-frequency voltages to a corresponding one of winding groups of a rotating electric machine; and a rotation angle estimating unit that estimates a rotation angle of the rotating electric machine based on at least one of high-frequency currents that flow in the winding groups upon application of the high-frequency voltages to the winding groups. Moreover, the high-frequency voltage setting unit sets the high-frequency voltages based on the spatial phase difference between the winding groups so that in a fixed coordinate system of the rotating electric machine, the magnitude of a resultant vector of a plurality of high-frequency voltage vectors, which are respectively applied to the winding
(Continued)

groups, becomes smaller than the magnitude of each of the high-frequency voltage vectors.

6 Claims, 11 Drawing Sheets

(51) Int. Cl.
    *H02P 21/26* (2016.01)
    *H02P 6/18* (2016.01)
    *H02P 25/03* (2016.01)

(52) U.S. Cl.
    CPC .............. *G05B 2219/37523* (2013.01); *G05B 2219/42148* (2013.01); *G05B 2219/50191* (2013.01); *H02P 25/03* (2016.02); *H02P 2203/11* (2013.01)

(58) Field of Classification Search
    USPC .... 318/400.01, 400.02, 400.14, 400.15, 700, 318/701, 721, 726, 727, 779, 799, 800, 318/801, 599, 430; 388/800, 819; 363/21.1, 40, 44, 95, 120, 174, 175
    See application file for complete search history.

(56) References Cited

U.S. PATENT DOCUMENTS

| | | |
|---|---|---|
| 2004/0066205 A1 | 4/2004 | Imai et al. |
| 2004/0257030 A1 | 12/2004 | Taguchi et al. |
| 2014/0207335 A1 | 7/2014 | Mikamo et al. |
| 2016/0111951 A1 | 4/2016 | Taniguchi et al. |

FOREIGN PATENT DOCUMENTS

| | | |
|---|---|---|
| JP | 2007-325406 A | 12/2007 |
| JP | 2010-22189 A | 1/2010 |
| JP | 2013-223352 A | 10/2013 |
| JP | 2014-90643 A | 5/2014 |

* cited by examiner

ROTATION ANGLE ESTIMATION APPARATUS FOR ROTATING ELECTRIC MACHINE

CROSS-REFERENCE TO RELATED APPLICATION

This application is based on and claims priority from Japanese Patent Application No. 2016-144325 filed on Jul. 22, 2016, the content of which is hereby incorporated by reference in its entirety into this application.

BACKGROUND

1 Technical Field

The present invention relates to rotation angle estimation apparatuses for rotating electric machines.

2 Description of Related Art

There are known rotation angle estimation apparatuses for rotating electric machines. Theses apparatuses are configured to reduce noise generated due to application of high-frequency voltages for rotation angle estimation. More specifically, in these apparatuses, to reduce the noise, at least one of the following techniques are used: (1) increasing separation between the frequencies of the high-frequency voltages; (2) lowering the frequencies of the high-frequency voltages to fall outside the audible frequency range; and (3) lowering the amplitudes of the high-frequency voltages (see, for example, "An Adjusted Current Control System for Signal-injection-based Position Sensorless Control and Parameter Identification", Suk-Hwa Jung et al., IEEJ Transactions on Industry Applications, Vol. 132, No. 3, pp. 418-425).

However, with the above techniques, it is impossible to sufficiently reduce the noise generated due to application of the high-frequency voltages. Moreover, the rotation angle estimation accuracy is sacrificed for reduction of the noise.

SUMMARY

According to exemplary embodiments, there is provided a rotation angle estimation apparatus for a rotating electric machine. The rotation angle estimation apparatus is applied to a system which includes the rotating electric machine and an electric power conversion circuit. The rotating electric machine includes a stator having a plurality of winding groups wound therein. Each of the winding groups is offset from another of the winding groups to have a spatial phase difference therebetween. The electric power conversion circuit is electrically connected with the winding groups to apply voltages to the winding groups. The rotation angle estimation apparatus includes: a high-frequency voltage setting unit that sets a plurality of high-frequency voltages which change at an angular velocity higher than an electrical angular velocity of the rotating electric machine; a circuit operating unit that operates (or controls) the electric power conversion circuit to apply each of the high-frequency voltages set by the high-frequency voltage setting unit to a corresponding one of the winding groups; and a rotation angle estimating unit that estimates a rotation angle of the rotating electric machine based on at least one of high-frequency currents that flow in the winding groups upon application of the high-frequency voltages to the winding groups. Moreover, the high-frequency voltage setting unit sets the high-frequency voltages based on the spatial phase difference between the winding groups so that in a fixed coordinate system of the rotating electric machine, the magnitude of a resultant vector of a plurality of high-frequency voltage vectors, which are respectively applied to the winding groups, becomes smaller than the magnitude of each of the high-frequency voltage vectors.

In the above rotation angle estimation apparatus, the rotation angle estimating unit estimates the rotation angle of the rotating electric machine based on at least one of the high-frequency currents that flow in the winding groups upon application of the high-frequency voltages to the winding groups. Therefore, if the high-frequency voltages were not suitably set, it would be difficult to reduce noise generated due to application of the high-frequency voltages to the winding groups.

However, in the above rotation angle estimation apparatus, the high-frequency voltage setting unit sets the high-frequency voltages, taking into account the spatial phase difference between the winding groups, so that in the fixed coordinate system, the magnitude of the resultant vector of the high-frequency voltage vectors becomes smaller than the magnitude of each of the high-frequency voltage vectors. Consequently, it becomes possible to reduce noise generated due to application of the high-frequency voltages to the winding groups without using any of the known techniques described previously and thus without sacrificing the rotation angle estimation accuracy.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
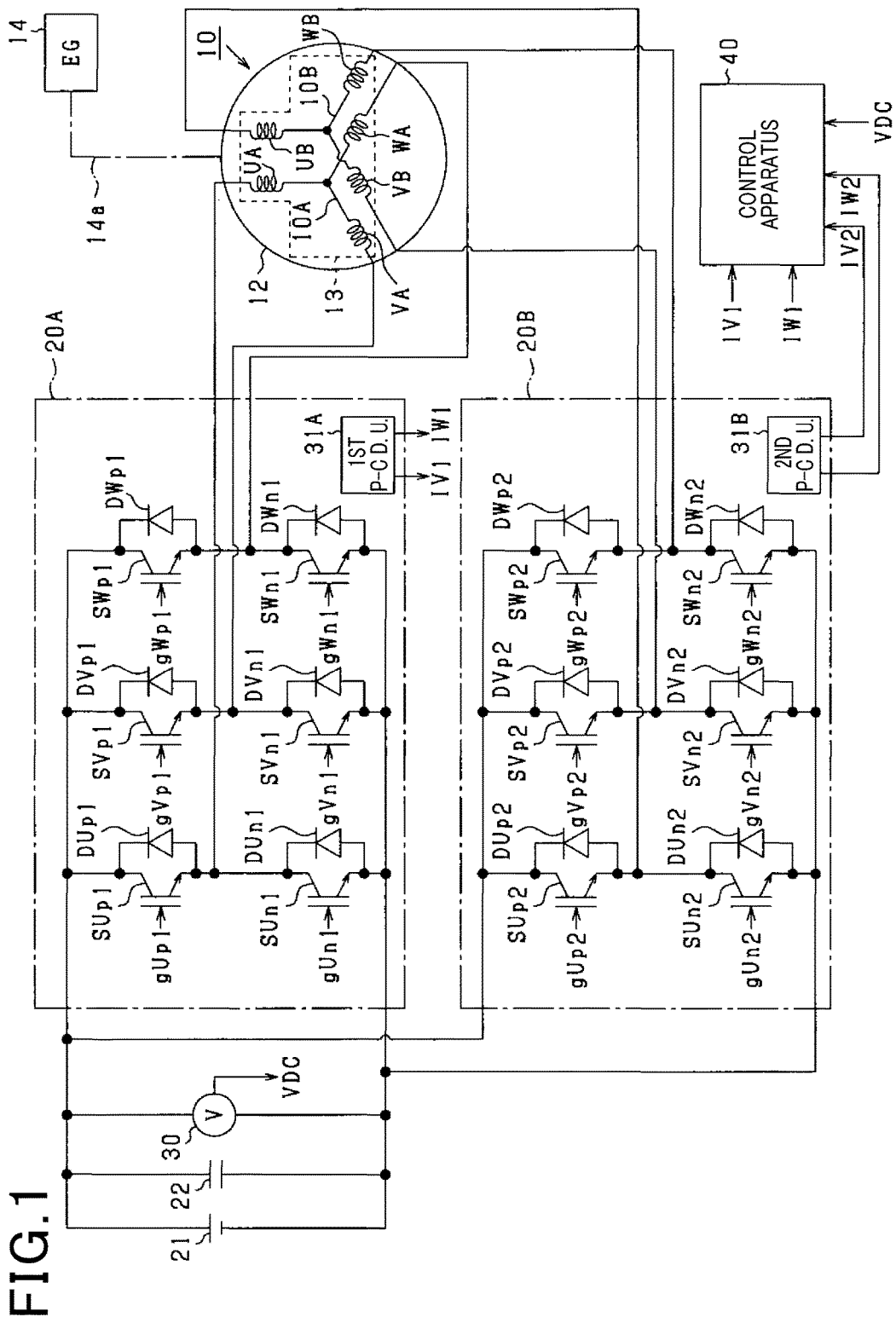
FIG. 1 is an overall configuration diagram of a rotating electric machine system according to a first embodiment.

Exemplary embodiments will be described hereinafter with reference to FIGS. 1-14. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine system according to a first embodiment.

In the present embodiment, the rotating electric machine system is installed in a motor vehicle which includes an engine 14.

As shown in FIG. 1, the rotating electric machine system includes a rotating electric machine 10. In the present embodiment, the rotating electric machine 10 is configured as a multi-phase multi-winding group machine, more particularly as a three-phase two-winding group synchronous machine. In addition, the rotating electric machine 10 may be of either a permanent magnet type or a field winding type.

More specifically, in the present embodiment, the rotating electric machine 10 is implemented by an ISG (Integrated Starter Generator) that can selectively function either as an electric motor or an electric generator.

The rotating electric machine 10 includes a rotor 12 that is mechanically connected with a crankshaft 14a of the engine 14 to provide/receive mechanical power to/from the crankshaft 14a. More particularly, in the present embodiment, the rotor 12 is mechanically connected with the crankshaft 14a of the engine 14 via a belt (not shown).

In addition, in the present embodiment, during the initial starting of the engine 14, the rotating electric machine 10 functions as an engine starter. Moreover, in the case of performing an automatic stop/restart function (also called idling stop function) for the engine 14, the rotating electric machine 10 functions as the engine starter as well. The automatic stop/restart function is such a function as to: automatically stop the engine 14 when a predetermined automatic stop condition is satisfied; and automatically restart the engine 14 when a predetermined automatic restart condition is satisfied.

The rotating electric machine 10 further includes a stator 13 that has both a first winding group 10A and a second winding group 10B wound therein. In addition, the first winding group 10A corresponds to a "reference winding group" and the second winding group 10B corresponds to a "remaining winding group".

In the present embodiment, both the first and second winding groups 10A and 10B interact with the same rotor 12. Moreover, each of the first and second winding groups 10A and 10B is comprised of three phase windings that are star-connected to define a neutral point therebetween.

Specifically, the first winding group 10A is comprised of a U-phase winding UA, a V-phase winding VA and a W-phase winding WA that are offset from each other by 120° in electrical angle and electrically connected to define a first neutral point therebetween. On the other hand, the second winding group 10B is comprised of a U-phase winding UB, a V-phase winding VB and a W-phase winding WB that are offset from each other by 120° in electrical angle and electrically connected to define a second neutral point therebetween.

Figure 2:
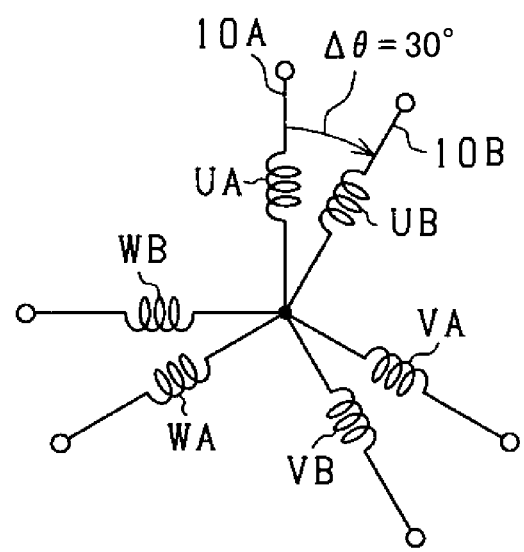
FIG. 2 is a schematic view illustrating the spatial phase difference between a first winding group and a second winding group of a rotating electric machine of the system according to the first embodiment.

Moreover, in the present embodiment, as shown in FIG. 2, the first and second winding groups 10A and 10B are wound in the stator 13 so that the spatial phase difference $\Delta\theta$ between the first and second winding groups 10A and 10B is equal to 30° in electrical angle.

That is, the spatial phase difference $\Delta\theta$ between the U-phase winding UA of the first winding group 10A and the U-phase winding UB of the second winding group 10B is equal to 30° in electrical angle; the spatial phase difference $\Delta\theta$ between the V-phase winding VA of the first winding group 10A and the V-phase winding VB of the second winding group 10B is equal to 30° in electrical angle; and the spatial phase difference $\Delta\theta$ between the W-phase winding WA of the first winding group 10A and the W-phase winding WB of the second winding group 10B is equal to 30° in electrical angle.

In addition, in the present embodiment, the second winding group 10B is offset from the first winding group 10A toward the advancing side by the spatial phase difference $\Delta\theta$.

In the present embodiment, the first winding group 10A and the second winding group 10B have the same configuration. More specifically, the number of turns of each of the U-phase, V-phase and W-phase windings UA, VA and WA of the first winding group 10A is set to be equal to the number of turns of each of the U-phase, V-phase and W-phase windings UB, VB and WB of the second winding group 10B.

Referring back to FIG. 1, the rotating electric machine system also includes a first inverter 20A and a second inverter 20B that are respectively electrically connected with the first and second winding groups 10A and 10B of the rotating electric machine 10. The first and second inverters 20A and 20B together correspond to an "electric power conversion circuit" that applies voltages to the first and second winding groups 10A and 10B.

The first inverter 20A includes: a pair of a first U-phase upper-arm switch SUp1 and a first U-phase lower-arm switch SUn1 that are electrically connected in series with each other; a pair of a first V-phase upper-arm switch SVp1 and a first V-phase lower-arm switch SVn1 that are electrically connected in series with each other; and a pair of a first W-phase upper-arm switch SWp1 and a first W-phase lower-arm switch SWn1 that are electrically connected in series with each other. Moreover, to the junction point between the first U-phase upper-arm switch SUp1 and the first U-phase lower-arm switch SUn1, there is electrically connected the U-phase winding UA of the first winding group 10A; to the junction point between the first V-phase upper-arm switch SVp1 and the first V-phase lower-arm switch SVn1, there is electrically connected the V-phase winding VA of the first winding group 10A; to the junction point between the first W-phase upper-arm switch SWp1 and the first W-phase lower-arm switch SWn1, there is electrically connected the W-phase winding WA of the first winding group 10A. Moreover, the switches SUp1, SUn1, SVp1, SVn1, SWp1 and SWn1 respectively have diodes DUp1, DUn1, DVp1, DVn1, DWp1 and DWn1 electrically connected in antiparallel (or inverse parallel) thereto. In the present embodiment, each of the switches SUp1, SUn1, SVp1, SVn1, SWp1 and SWn1 is implemented by an IGBT (Insulated Gate Bipolar Transistor). However, it should be appreciated that each of the switches SUp1, SUn1, SVp1, SVn1, SWp1 and SWn1 may alternatively be implemented by other switching elements, such as an N-channel MOSFET (Metal-Oxide-Semiconductor Field-Effect Transistor).

On the other hand, the second inverter 20B includes: a pair of a second U-phase upper-arm switch SUp2 and a second U-phase lower-arm switch SUn2 that are electrically connected in series with each other; a pair of a second V-phase upper-arm switch SVp2 and a second V-phase lower-arm switch SVn2 that are electrically connected in series with each other; and a pair of a second W-phase upper-arm switch SWp2 and a second W-phase lower-arm switch SWn2 that are electrically connected in series with each other. Moreover, to the junction point between the second U-phase upper-arm switch SUp2 and the second U-phase lower-arm switch SUn2, there is electrically connected the U-phase winding UB of the second winding group 10B; to the junction point between the second V-phase upper-arm switch SVp2 and the second V-phase lower-arm switch SVn2, there is electrically connected the V-phase winding VB of the second winding group 10B; to the junction point between the second W-phase upper-arm switch SWp2 and the second W-phase lower-arm switch SWn2, there is electrically connected the W-phase winding WB of the second winding group 10B. Moreover, the switches SUp2, SUn2, SVp2, SVn2, SWp2 and SWn2 respectively have diodes DUp2, DUn2, DVp2, DVn2, DWp2 and DWn2 electrically connected in antiparallel thereto. In the present embodiment, each of the switches SUp2, SUn2, SVp2, SVn2, SWp2 and SWn2 is implemented by an IGBT. However, it should be appreciated that each of the switches SUp2, SUn2, SVp2, SVn2, SWp2 and SWn2 may alternatively be implemented by other switching elements, such as an N-channel MOSFET.

The collectors (i.e., high potential-side terminals) of the upper-arm switches SUp1-SWp1 and SUp2-SWp2 of the first and second inverters 20A and 20B are electrically connected to a positive terminal of a battery 21 which is a DC power source. On the other hand, the emitters (i.e., low potential-side terminals) of the lower-arm switches SUn1-SWn1 and SUn2-SWn2 of the first and second inverters 20A and 20B are electrically connected to a negative terminal of the battery 21. That is, in the present embodiment, both the first and second inverters 20A and 20B are powered by the same battery 21.

In the present embodiment, the nominal voltage of the battery 21 is set to, for example, 12V. Moreover, the battery 21 has a capacitor 22 electrically connected in parallel thereto. In addition, the battery 21 may be implemented by, for example, a lead-acid battery.

When the rotating electric machine 10 functions as an electric motor, the first and second inverters 20A and 20B convert DC power outputted from the battery 21 into AC power and output the resultant AC power to the first and second winding groups 10A and 10B of the rotating electric machine 10. On the other hand, when the rotating electric machine 10 functions as an electric generator, the first and second inverters 20A and 20B convert AC power outputted from the first and second winding groups 10A and 10B of the rotating electric machine 10 into DC power and output the resultant DC power to the battery 21 to charge it.

In the present embodiment, the rotating electric machine system further includes a voltage detecting unit 30, a first phase-current detecting unit (abbreviated to 1ST P-C D. U. in FIG. 1) 31A, a second phase-current detecting unit (abbreviated to 2ND P-C D. U. in FIG. 1) 31B and a control apparatus 40.

The voltage detecting unit 30 detects the terminal voltage of the battery 21 as a power source voltage VDC.

The first phase-current detecting unit 31A detects at least two of three phase currents respectively flowing in the U-phase, V-phase and W-phase windings UA, VA and WA of the first winding group 10A. On the other hand, the second phase-current detecting unit 31B detects at least two of three phase currents respectively flowing in the U-phase, V-phase and W-phase windings UB, VB and WB of the second winding group 10B.

More particularly, in the present embodiment, the first phase-current detecting unit 31A detects the V-phase and W-phase currents IV1 and IW1 respectively flowing in the V-phase and W-phase windings VA and WA of the first winding group 10A. On the other hand, the second phase-current detecting unit 31B detects the V-phase and W-phase currents IV2 and IW2 respectively flowing in the V-phase and W-phase windings VB and WB of the second winding group 10B. In addition, the first and second phase-current detecting units 31A and 31B may be configured, for example, with current transformers or electrical resistors.

All of the power source voltage VDC detected by the voltage detecting unit 30, the V-phase and W-phase currents IV1 and IW1 detected by the first phase-current detecting unit 31A and the V-phase and W-phase currents IV2 and IW2 detected by the second phase-current detecting unit 31B are inputted to the control apparatus 40.

The control apparatus 40 is configured mainly with a microcomputer; the microcomputer includes a memory having programs stored therein and a CPU that executes the programs.

To control a controlled variable of the rotating electric machine 10 to its command value, the control apparatus 40 generates, based on the detection results of the voltage detecting unit 30 and the first and second phase-current detecting units 31A and 31B, operation signals for operating the switches of the first and second inverters 20A and 20B.

More particularly, in the present embodiment, the controlled variable is torque of the rotating electric machine 10; the command value of the controlled variable is command torque Trq*. As shown in FIG. 1, the control apparatus 40 generates: first operation signals gUp1, gUn1, gVp1, gVn1, gWp1 and gWn1 for respectively operating the switches SUp1, SUn1, SVp1, SVn1, SWp1 and SWn1 of the first inverter 20A; and second operation signals gUp2, gUn2, gVp2, gVn2, gWp2 and gWn2 for respectively operating the switches SUp2, SUn2, SVp2, SVn2, SWp2 and SWn2 of the second inverter 20B.

Next, referring to FIG. 3, torque control of the rotating electric machine 10, which is performed by the control apparatus 40 when the rotating electric machine 10 functions as an electric motor, will be described.

In the present embodiment, the torque control is a position sensorless control which uses an estimated electrical angle instead of the detection results of a detecting device (e.g., a resolver) that directly detects an electrical angle indicative of the magnetic pole position of the rotating electric machine 10.

In addition, in the present embodiment, the control apparatus 40 includes a "high-frequency voltage setting unit", a "circuit operating (or controlling) unit" and a "rotation angle estimating unit".

Figure 3:
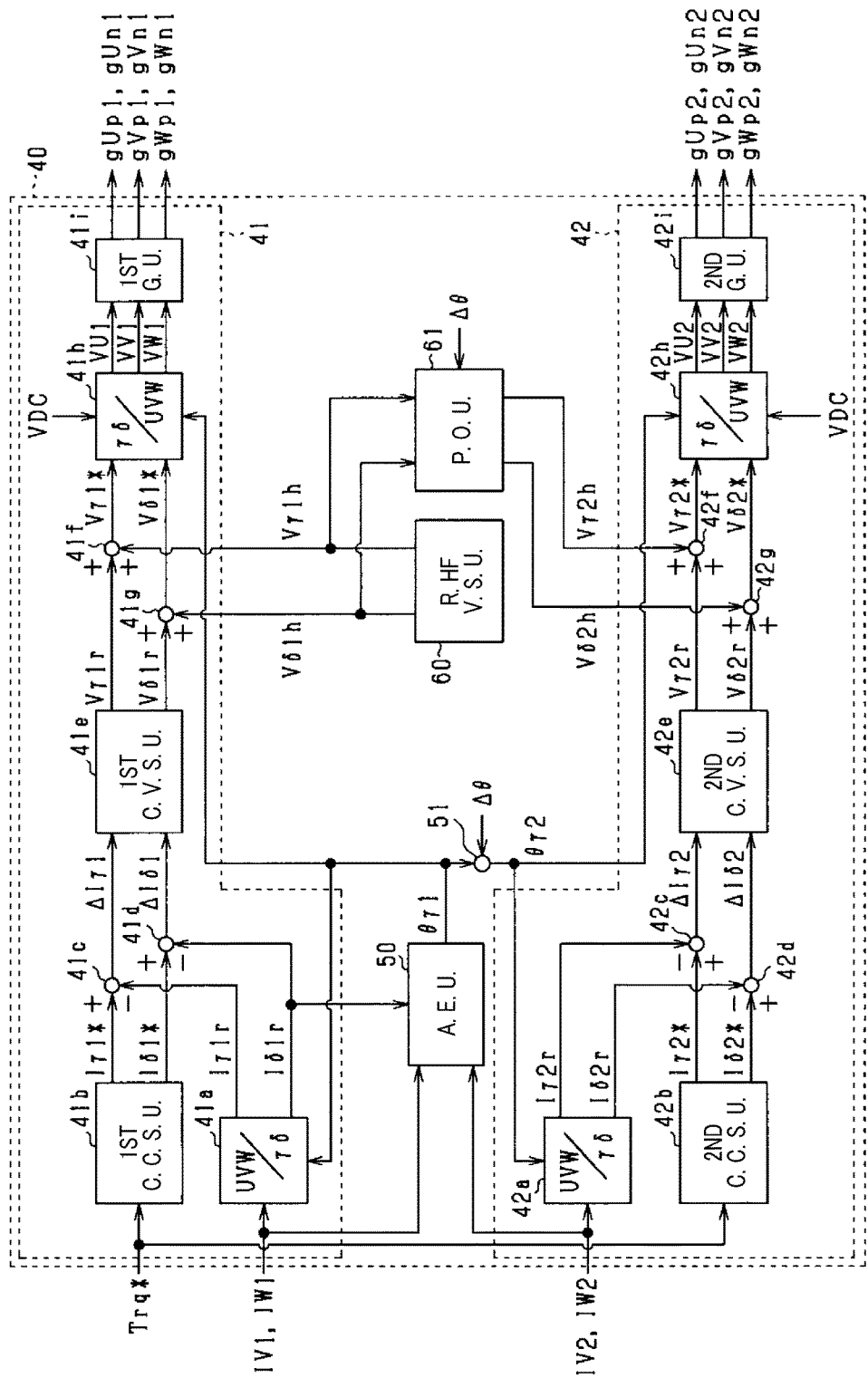
FIG. 3 is a block diagram illustrating the configuration of a control apparatus of the system according to the first embodiment.
Figure 4:
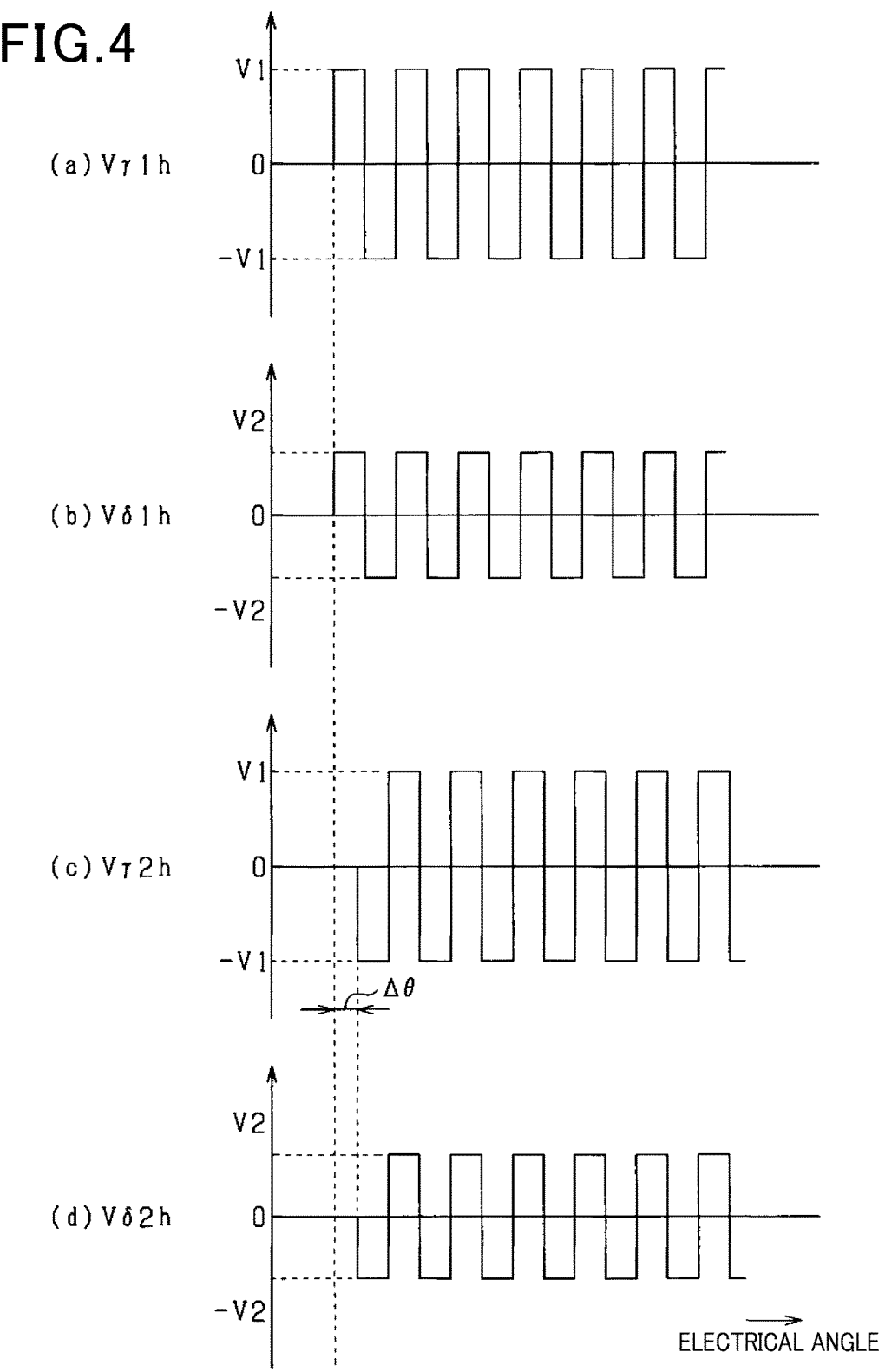
FIG. 4 is a waveform chart illustrating the waveforms of high-frequency voltages applied to the first and second winding groups.

As shown in FIG. 3, the control apparatus 40 includes a first processing unit 41 and a second processing unit 42, which respectively correspond to the first and second inverters 20A and 20B.

The first processing unit 41 includes a first current converting unit 41a, a first command current setting unit (abbreviated to 1ST C. C. S. U. in FIG. 3) 41b, a first γ-axis current deviation calculating unit 41c, a first δ-axis current deviation calculating unit 41d, a first command voltage setting unit (abbreviated to 1ST C. V. S. U. in FIG. 3) 41e, a first γ-axis voltage superimposing unit 41f, a first δ-axis voltage superimposing unit 41g, a first voltage converting unit 41h and a first generating unit (abbreviated to 1ST G. U. in FIG. 3) 41i.

The first current converting unit 41a converts the U-phase, V-phase and W-phase currents of the first winding group 10A in a U-V-W coordinate system into a first γ-axis current Iγ1r and a first δ-axis current Iδ1r in a γ-δ coordinate system on the basis of a first estimated angle θγ1 and the V-phase and W-phase currents IV1 and IW1. Here, the U-V-W coordinate system is a three-phase fixed coordinate system of the rotating electric machine 10. The γ-δ coordinate system is an estimated coordinate system representing a d-q coordinate system that is a two-phase rotating coordinate system of the rotating electric machine 10. The first estimated angle θγ1 is an estimated value of the electrical angle of the rotating electric machine 10 which is estimated by an angle estimating unit 50 to be described later. The V-phase and W-phase currents IV1 and IW1 are detected by the first phase-current detecting unit 31A.

The first command current setting unit 41b sets, based on the command torque Trq*, a first γ-axis command current Iγ1* and a first δ-axis command current Iδ1*.

The first γ-axis current deviation calculating unit 41c calculates a first γ-axis current deviation ΔIγ1 by subtracting the first γ-axis current Iγ1r from the first γ-axis command current Iγ1*.

The first δ-axis current deviation calculating unit 41d calculates a first δ-axis current deviation ΔIδ1 by subtracting the first δ-axis current Iδ1r from the first δ-axis command current Iδ1*.

The first command voltage setting unit 41e sets, based on the first γ-axis current deviation ΔIγ1, a first γ-axis voltage Vγ1r as the manipulated variable for feedback-controlling the first γ-axis current Iγ1r to the first γ-axis command current Iγ1*. Moreover, the first command voltage setting unit 41e also sets, based on the first δ-axis current deviation ΔIδ1, a first δ-axis voltage Vδ1r as the manipulated variable for feedback-controlling the first δ-axis current Iδ1r to the first δ-axis command current Iδ1*. In addition, as the above feedback control, a PI (Proportional-Integral) control may be used.

The first γ-axis voltage superimposing unit 41f superimposes a first γ-axis high-frequency voltage Vγ1h on the first γ-axis voltage Vγ1r and outputs the result of the superimposition as a first γ-axis command voltage Vγ1*. Here, the first γ-axis high-frequency voltage Vγ1h is set by a reference high-frequency voltage setting unit 60 to be described later.

The first δ-axis voltage superimposing unit 41g superimposes a first δ-axis high-frequency voltage Vδ1h on the first δ-axis voltage Vδ1r and outputs the result of the superimposition as a first δ-axis command voltage Vδ1*. Here, the first δ-axis high-frequency voltage Vδ1h is also set by the reference high-frequency voltage setting unit 60.

It should be noted that the first γ-axis high-frequency voltage Vγ1h and the first δ-axis high-frequency voltage Vδ1h change (or vary) at an angular velocity sufficiently higher than the electrical angular velocity of the fundamental components of the first γ-axis command voltage Vγ1* and the first δ-axis command voltage Vδ1*.

The first voltage converting unit 41h coverts the first γ-axis command voltage Vγ1* and the first δ-axis command voltage Vδ1* in the γ-δ coordinate system into a first U-phase command voltage VU1, a first V-phase command voltage VV1 and a first W-phase command voltage VW1 in the U-V-W coordinate system on the basis of the first γ-axis command voltage Vγ1*, the first δ-axis command voltage Vδ1*, the power source voltage VDC detected by the voltage detecting unit 30 and the first estimated angle θγ1.

In addition, in the present embodiment, the first U-phase command voltage VU1, the first V-phase command voltage VV1 and the first W-phase command voltage VW1 are in the form of sinusoidal signals that have a central value of 0 and are offset in phase from each other by 120° in electrical angle.

The first generating unit 41i generates the first operation signals gUp1, gUn1, gVp1, gVn1, gWp1 and gWn1 on the basis of the first U-phase command voltage VU1, the first V-phase command voltage VV1 and the first W-phase command voltage VW1 outputted from the first voltage converting unit 41h. Then, the first generating unit 41i outputs the generated first operation signals gUp1, gUn1, gVp1, gVn1, gWp1 and gWn1 respectively to the switches SUp1, SUn1, SVp1, SVn1, SWp1 and SWn1 of the first inverter 20A.

The first operation signals gUp1, gUn1, gVp1, gVn1, gWp1 and gWn1 may be generated by a PWM control based on comparison of magnitude between each of the first U-phase command voltage VU1, the first V-phase command voltage VV1 and the first W-phase command voltage VW1 with a carrier signal. In addition, as the carrier signal, a triangular-wave signal may be used.

Each of the first operation signals gUp1, gVp1 and gWp1 for operating the upper-arm switches SUp1, SVp1 and SWp1 of the first inverter 20A is complementary to a corresponding one of the first operation signals gUn1, gVn1 and gWn1 for operating the lower-arm switches SUn1, SVn1 and SWn1 of the first inverter 20A. Consequently, each of the upper-arm switches SUp1, SVp1 and SWp1 is turned on alternately with a corresponding one of the lower-arm switches SUn1, SVn1 and SWn1.

On the other hand, the second processing unit 42 includes a second current converting unit 42a, a second command current setting unit (abbreviated to 2ND C. C. S. U. in FIG. 3) 42b, a second γ-axis current deviation calculating unit 42c, a second δ-axis current deviation calculating unit 42d, a second command voltage setting unit (abbreviated to 2ND C. V. S. U. in FIG. 3) 42e, a second γ-axis voltage superimposing unit 42f, a second δ-axis voltage superimposing unit 42g, a second voltage converting unit 42h and a second generating unit (abbreviated to 2ND G. U. in FIG. 3) 42i.

The second current converting unit 42a converts the U-phase, V-phase and W-phase currents of the second winding group 10B in the U-V-W coordinate system into a second γ-axis current Iγ2r and a second δ-axis current Iδ2r in the γ-δ coordinate system on the basis of a second estimated angle θγ2 and the V-phase and W-phase currents IV2 and IW2. Here, the second estimated angle θγ2 is calculated, by an angle addition unit 51, as the sum of the first estimated angle θγ1 and the spatial phase difference Δθ between the first and second winding groups 10A and 10B. That is, the second estimated angle θγ2 is advanced from the first estimated angle θγ1 by the spatial phase difference Δθ. The V-phase and W-phase currents IV2 and IW2 are detected by the second phase-current detecting unit 31B.

The second command current setting unit 42b sets, based on the command torque Trq*, a second γ-axis command current Iγ2* and a second δ-axis command current Iδ2*.

It should be noted that the first γ-axis command current Iγ1*, the first δ-axis command current Iδ1*, the second γ-axis command current Iγ2* and the second δ-axis command current Iδ2* are set by the first and second command current setting units 42a and 42b so as to bring the torque of the rotating electric machine 10 into agreement with the command torque Trq*.

In addition, the first γ-axis command current Iγ1* and the second γ-axis command current Iγ2* may be set to be either equal to or different from each other. Similarly, the first δ-axis command current Iδ1* and the second δ-axis command current Iδ2* may be set to be either equal to or different from each other.

The second γ-axis current deviation calculating unit 42c calculates a second γ-axis current deviation ΔIγ2 by subtracting the second γ-axis current Iγ2r from the second γ-axis command current Iγ2*.

The second δ-axis current deviation calculating unit 42d calculates a second δ-axis current deviation ΔIδ2 by subtracting the second δ-axis current Iδ2r from the second δ-axis command current Iδ2*.

The second command voltage setting unit 42e sets, based on the second γ-axis current deviation ΔIγ2, a second γ-axis voltage Vγ2r as the manipulated variable for feedback-controlling the second γ-axis current Iγ2r to the second γ-axis command current Iγ2*. Moreover, the second command voltage setting unit 42e also sets, based on the second δ-axis current deviation ΔIδ2, a second δ-axis voltage Vδ2r as the manipulated variable for feedback-controlling the second δ-axis current Iδ2r to the second δ-axis command current Iδ2*. In addition, as the above feedback control, a PI control may be used.

The second γ-axis voltage superimposing unit 42f superimposes a second γ-axis high-frequency voltage Vγ2h on the second γ-axis voltage Vγ2r and outputs the result of the superimposition as a second γ-axis command voltage Vγ2*. Here, the second γ-axis high-frequency voltage Vγ2h is set by a phase operating unit 61 to be described later.

The second δ-axis voltage superimposing unit 42g superimposes a second δ-axis high-frequency voltage Vδ2h on the second δ-axis voltage Vδ2r and outputs the result of the superimposition as a second δ-axis command voltage Vδ2*. Here, the second δ-axis high-frequency voltage Vδ2h is also set by the phase operating unit 61.

It should be noted that the second γ-axis high-frequency voltage Vγ2h and the second δ-axis high-frequency voltage Vδ2h change at an angular velocity sufficiently higher than the electrical angular velocity of the fundamental components of the second γ-axis command voltage Vγ2* and the second δ-axis command voltage Vδ2*.

The second voltage converting unit 42h coverts the second γ-axis command voltage Vγ2* and the second δ-axis command voltage Vδ2* in the γ-δ coordinate system into a second U-phase command voltage VU2, a second V-phase command voltage VV2 and a second W-phase command voltage VW2 in the U-V-W coordinate system on the basis of the second γ-axis command voltage Vγ2*, the second δ-axis command voltage Vδ2*, the power source voltage VDC detected by the voltage detecting unit 30 and the second estimated angle θγ2.

In addition, in the present embodiment, the second U-phase command voltage VU2, the second V-phase command voltage VV2 and the second W-phase command voltage VW2 are in the form of sinusoidal signals that have a central value of 0 and are offset in phase from each other by 120° in electrical angle.

The second generating unit 42i generates the second operation signals gUp2, gUn2, gVp2, gVn2, gWp2 and gWn2 on the basis of the second U-phase command voltage VU2, the second V-phase command voltage VV2 and the second W-phase command voltage VW2 outputted from the second voltage converting unit 42h. Then, the second generating unit 42i outputs the generated second operation signals gUp2, gUn2, gVp2, gVn2, gWp2 and gWn2 respectively to the switches SUp2, SUn2, SVp2, SVn2, SWp2 and SWn2 of the second inverter 20B.

The second operation signals gUp2, gUn2, gVp2, gVn2, gWp2 and gWn2 may be generated by a PWM control based on comparison of magnitude between each of the second U-phase command voltage VU2, the second V-phase command voltage VV2 and the second W-phase command voltage VW2 with a carrier signal. In addition, as the carrier signal, a triangular-wave signal may be used.

Each of the second operation signals gUp2, gVp2 and gWp2 for operating the upper-arm switches SUp2, SVp2 and SWp2 of the second inverter 20B is complementary to a corresponding one of the second operation signals gUn2, gVn2 and gWn2 for operating the lower-arm switches SUn2, SVn2 and SWn2 of the second inverter 20B. Consequently, each of the upper-arm switches SUp2, SVp2 and SWp2 is turned on alternately with a corresponding one of the lower-arm switches SUn2, SVn2 and SWn2.

The angle estimating unit (abbreviated to A. E. U. in FIG. 3) 50 estimates the first estimated angle θγ1 on the basis of the first δ-axis current Iδ1r outputted from the first current converting unit 41a. More specifically, the angle estimating unit 50 first extracts the high-frequency component from the first δ-axis current Iδ1r. Moreover, in the case where the electrical angle of the rotating electric machine 10 is varied to have various values, the angle estimating unit 50 sets that value of the electrical angle at which the extracted high-frequency component is the minimum as the first estimated angle θγ1. In addition, the extraction of the high-frequency component may be carried out by, for example, a band-pass filter or a high-pass filter.

It should be noted that the first estimated angle θγ1 may also be estimated in other ways. For example, the first estimated angle θγ1 may also be estimated on the basis of the second δ-axis current Iδ2r outputted from the second current converting unit 42a. Alternatively, the first estimated angle θγ1 may also be estimated so that the vector product of the vector of the high-frequency voltage applied to one of the phase windings of the first winding group 10A and the vector of the high-frequency current flowing in the phase winding upon the application of the high-frequency voltage becomes zero.

The reference high-frequency voltage setting unit (abbreviated to R. HF V. S. U. in FIG. 3) 60 is provided to set, during the torque control of the rotating electric machine 10, both the first γ-axis high-frequency voltage Vγ1h and the first δ-axis high-frequency voltage Vδ1h necessary for estimation of the first estimated angle θγ1.

In addition, the rotating electric machine 10 may be configured as either a salient-pole machine or a non-salient pole machine. In general, the rotation angle estimation through superimposition of high-frequency voltages is applied to salient-pole machines. However, even if the rotating electric machine 10 is configured as a non-salient-pole machine, it is still possible to estimate the rotation angle of the machine 10 through superimposition of the high-frequency voltages $V\gamma1h$, $V\delta1h$, $V\gamma2h$ and $V\delta2h$. More specifically, in starting the engine 14, large currents flow in the first and second winging groups 10A and 10B of the rotating electric machine 10, causing magnetic saturation to occur in the rotating electric machine 10. Upon the occurrence of magnetic saturation, the d-axis inductance and the q-axis inductance in the rotating electric machine 10 become different from each other, thereby making it possible to estimate the rotation angle of the machine 10 through superimposition of the high-frequency voltages $V\gamma1h$, $V\delta1h$, $V\gamma2h$ and $V\delta2h$.

The phase operating unit (abbreviated to P. O. U. in FIG. 3) 61 sets the second γ-axis high-frequency voltage $V\gamma2h$ on the basis of the first γ-axis high-frequency voltage $V\gamma1h$ set by the reference high-frequency voltage setting unit 60. The phase operating unit 61 also sets the second δ-axis high-frequency voltage $V\delta2h$ on the basis of the first δ-axis high-frequency voltage $V\delta1h$ set by the reference high-frequency voltage setting unit 60.

FIG. 4(a) shows the first γ-axis high-frequency voltage $V\gamma1h$ set by the reference high-frequency voltage setting unit 60. FIG. 4(b) shows the first δ-axis high-frequency voltage $V\delta1h$ set by the reference high-frequency voltage setting unit 60.

As shown in FIG. 4(a), the first γ-axis high-frequency voltage $V\gamma1h$ is in the form of a rectangular-wave pulse signal whose amplitude is set to a first amplitude V1. On the other hand, as shown in FIG. 4(b), the first δ-axis high-frequency voltage $V\delta1h$ is in the form of a rectangular-wave pulse signal whose amplitude is set to a second amplitude V2.

In the present embodiment, the frequencies of the first γ-axis high-frequency voltage $V\gamma1h$ and the first δ-axis high-frequency voltage $V\delta1h$ are set to be equal to each other. Moreover, the phases of the first γ-axis high-frequency voltage $V\gamma1h$ and the first δ-axis high-frequency voltage $V\delta1h$ are also set to be equal to each other. That is, the timing at which the sign of the first γ-axis high-frequency voltage $V\gamma1h$ is changed from negative to positive coincides with the timing at which the sign of the first δ-axis high-frequency voltage $V\delta1h$ is changed from negative to positive; the timing at which the sign of the first γ-axis high-frequency voltage $V\gamma1h$ is changed from positive to negative coincides with the timing at which the sign of the first δ-axis high-frequency voltage $V\delta1h$ is changed from positive to negative. In addition, the first amplitude V1 and the second amplitude V2 may be set to be either equal to or different from each other.

FIG. 4(c) shows the second γ-axis high-frequency voltage $V\gamma2h$ set by the phase operating unit 61. FIG. 4(d) shows the second δ-axis high-frequency voltage $V\delta2h$ set by the phase operating unit 61.

As shown in FIG. 4(c), the second γ-axis high-frequency voltage $V\gamma2h$ is in the form of a rectangular-wave pulse signal whose amplitude is set to the first amplitude V1 (i.e., set to be equal to the amplitude of the first γ-axis high-frequency voltage $V\gamma1h$). Moreover, the frequency of the second γ-axis high-frequency voltage $V\gamma2h$ is set to be equal to the frequency of the first γ-axis high-frequency voltage $V\gamma1h$. Furthermore, the second γ-axis high-frequency voltage $V\gamma2h$ is obtained by advancing a high-frequency voltage, which is offset from the first γ-axis high-frequency voltage $V\gamma1h$ by a half cycle (i.e., 180° in electrical angle), by the spatial phase difference Δθ between the first and second winding groups 10A and 10B of the rotating electric machine 10. In other words, the second γ-axis high-frequency voltage $V\gamma2h$ is obtained by first inverting the first γ-axis high-frequency voltage $V\gamma1h$ and then advancing it by the spatial phase difference Δθ.

On the other hand, as shown in FIG. 4(d), the second δ-axis high-frequency voltage $V\delta2h$ is in the form of a rectangular-wave pulse signal whose amplitude is set to the second amplitude V2 (i.e., set to be equal to the amplitude of the first δ-axis high-frequency voltage $V\delta1h$). Moreover, the frequency of the second δ-axis high-frequency voltage $V\delta2h$ is set to be equal to the frequency of the first δ-axis high-frequency voltage $V\delta1h$. Furthermore, the second δ-axis high-frequency voltage $V\delta2h$ is obtained by advancing a high-frequency voltage, which is offset from the first δ-axis high-frequency voltage $V\delta1h$ by a half cycle (i.e., 180° in electrical angle), by the spatial phase difference Δθ between the first and second winding groups 10A and 10B of the rotating electric machine 10. In other words, the second δ-axis high-frequency voltage $V\delta2h$ is obtained by first inverting the first δ-axis high-frequency voltage $V\delta1h$ and then advancing it by the spatial phase difference Δθ.

Figure 5:
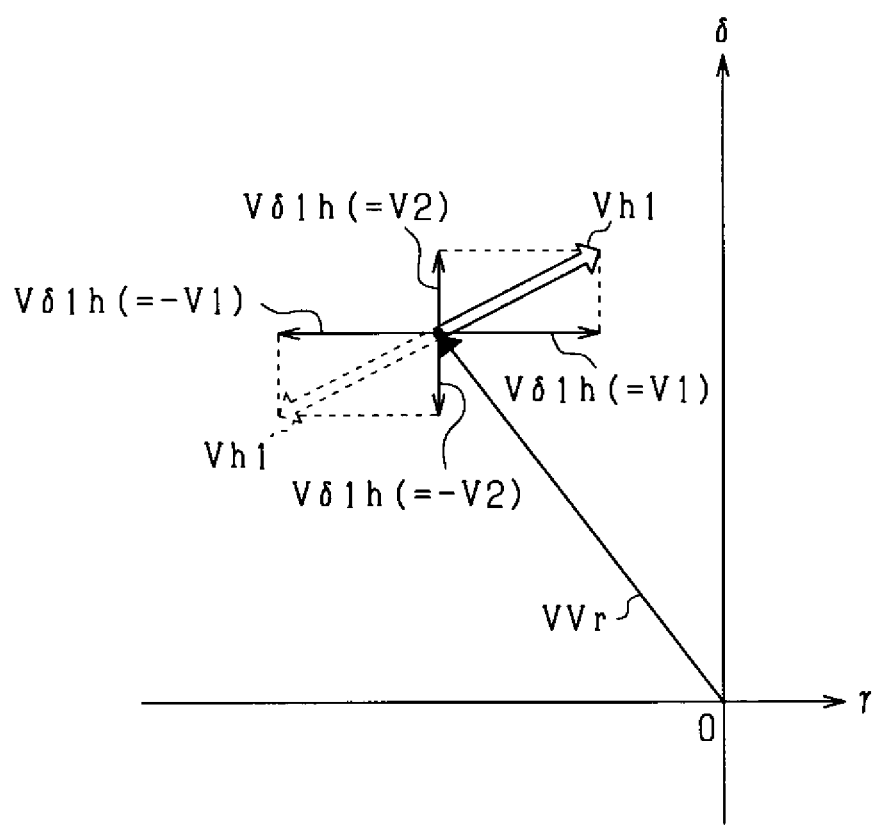
FIG. 5 is a vector diagram illustrating a first high-frequency voltage vector in a rotating coordinate system, the first high-frequency voltage vector being applied to the first winding group.

FIG. 5 shows the first γ-axis high-frequency voltage $V\gamma1h$ and the first δ-axis high-frequency voltage $V\delta1h$ respectively superimposed on the first γ-axis voltage $V\gamma1r$ and the first δ-axis voltage $V\delta1r$.

In addition, in FIG. 5, there is also shown the total drive voltage vector VVr which is the resultant vector of a first drive voltage vector Vr1 and a second drive voltage vector Vr2. The first drive voltage vector Vr1 is defined by the first γ-axis voltage $V\gamma1r$ and the first δ-axis voltage $V\delta1r$. The second drive voltage vector Vr2 is defined by the second γ-axis voltage $V\gamma2r$ and the second δ-axis voltage $V\delta2r$.

As shown in FIG. 5, a first high-frequency voltage vector Vh1, which is defined by (or composed of) the first γ-axis high-frequency voltage $V\gamma1h$ and the first δ-axis high-frequency voltage $V\delta1h$, extends from the distal end of the total drive voltage vector VVr. The first high-frequency voltage vector Vh1 is applied to the first winding group 10A. The sign of each of the first γ-axis high-frequency voltage $V\gamma1h$ and the first δ-axis high-frequency voltage $V\delta1h$ is cyclically inverted (or cyclically alternates between positive and negative). Therefore, the direction of the first high-frequency voltage vector Vh1 is also cyclically inverted as shown with a dashed-line arrow in FIG. 5.

Figure 6:
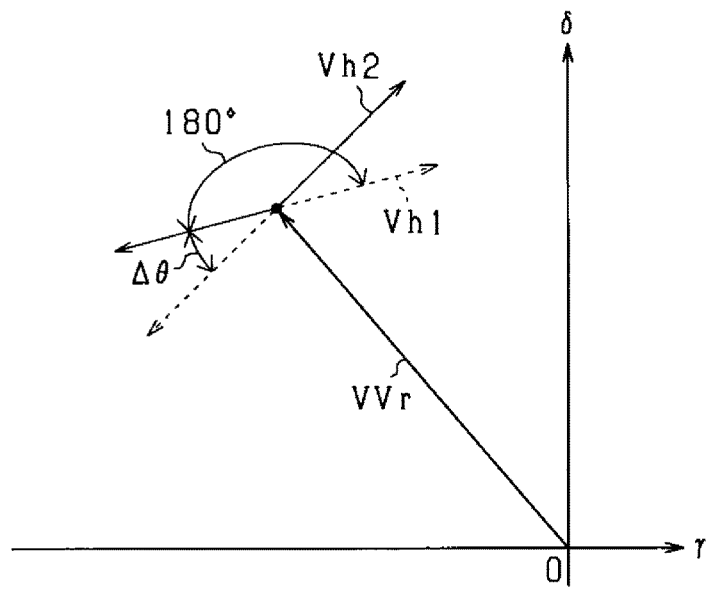
FIG. 6 is a vector diagram illustrating both the first high-frequency voltage vector and a second high-frequency voltage vector in the rotating coordinate system, the second high-frequency voltage vector being applied to the second winding group.

FIG. 6 shows both the first high-frequency voltage vector Vh1 and a second high-frequency voltage vector Vh2 that is applied to the second winding group 10B. The second high-frequency voltage vector Vh2, which is defined by the second γ-axis high-frequency voltage $V\gamma2h$ and the second δ-axis high-frequency voltage $V\delta2h$, also extends from the distal end of the total drive voltage vector VVr. The sign of each of the second γ-axis high-frequency voltage $V\gamma2h$ and the second δ-axis high-frequency voltage $V\delta2h$ is cyclically inverted. Therefore, the direction of the second high-frequency voltage vector Vh2 is also cyclically inverted as shown with a dashed-line arrow in FIG. 6. In addition, in the present embodiment, the magnitude of the second high-frequency voltage vector Vh2 is equal to the magnitude of the first high-frequency voltage vector Vh1.

Moreover, as shown in FIG. 6, in the γ-δ coordinate system, the first high-frequency voltage vector Vh1 and the second high-frequency voltage vector Vh2 make an angle of (180°+Δθ) with each other. Consequently, as shown in FIG.

7, in the U-V-W coordinate system, the first high-frequency voltage vector Vh1 that extends from the distal end of the first drive voltage vector Vr1 and the second high-frequency voltage vector Vh2 that extends from the distal end of the second drive voltage vector Vr2 make an angle of 180° with each other. That is, in the U-V-W coordinate system, the first high-frequency voltage vector Vh1 and the second high-frequency voltage vector Vh2 extend parallel to each other respectively toward opposite directions. Consequently, the first high-frequency voltage vector Vh1 and the second high-frequency voltage vector Vh2 are canceled by each other, thereby making the magnitude of the resultant vector of the first high-frequency voltage vector Vh1 and the second high-frequency voltage vector Vh2 equal to 0. Hence, according to the present embodiment, it is possible to reduce noise of the rotating electric machine 10 generated due to application of the high-frequency voltages for estimation of the rotation angle (or electrical angle) of the rotating electric machine 10.

Figure 7:
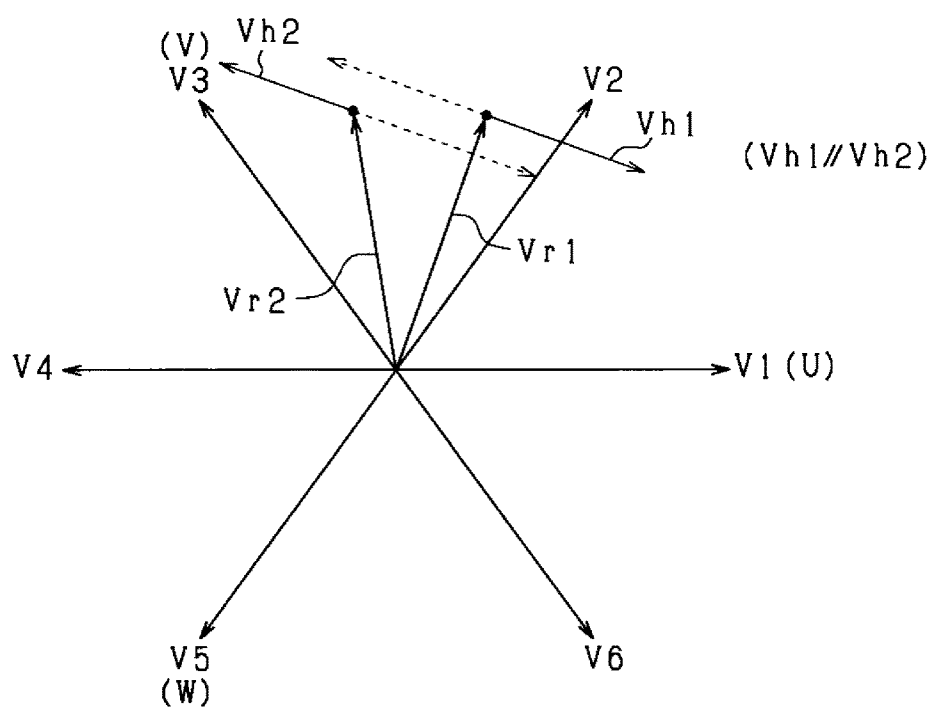
FIG. 7 is a vector diagram illustrating both the first and second high-frequency voltage vectors in a fixed coordinate system.

In addition, in FIG. 7, there are also shown active voltage vectors V1-V6. Here, V1 and V4 are the U-phase active voltage vectors respectively in opposite directions; V3 and V6 are the V-phase active voltage vectors respectively in opposite directions; V2 and V5 are the W-phase active voltage vectors respectively in opposite directions.

Figure 8:
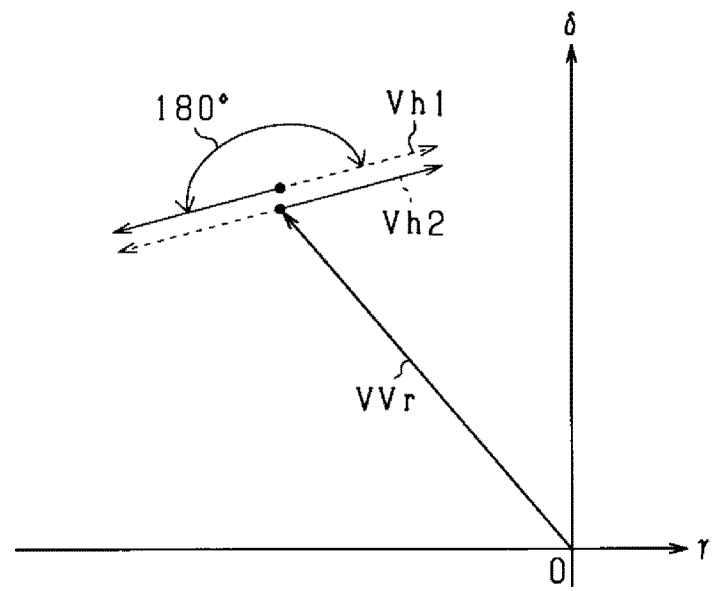
FIG. 8 is a vector diagram illustrating both a first high-frequency voltage vector and a second high-frequency voltage vector according to a related art in the rotating coordinate system.

In comparison, according to a related art, as shown in FIG. 8, the first high-frequency voltage vector Vh1 and the second high-frequency voltage vector Vh2 make an angle of 180° with each other in the γ-δ coordinate system.

In addition, it should be noted that: according to the related art, the first high-frequency voltage vector Vh1 and the second high-frequency voltage vector Vh2 overlap each other in FIG. 8; therefore, for the sake of differentiating the first high-frequency voltage vector Vh1 and the second high-frequency voltage vector Vh2 from each other, the first high-frequency voltage vector Vh1 is depicted in FIG. 8 so as to be offset from the distal end of the total drive voltage vector VVr.

Figure 9:
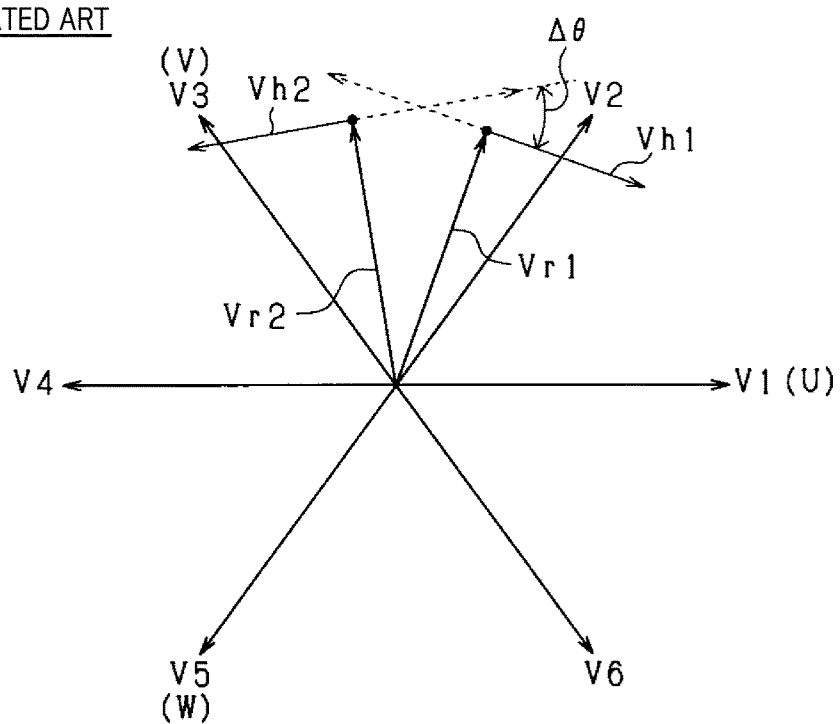
FIG. 9 is a vector diagram illustrating both the first and second high-frequency voltage vectors according to the related art in the fixed coordinate system.

Moreover, upon application of the first high-frequency voltage vector Vh1 and the second high-frequency voltage vector Vh2 according to the related art, as shown in FIG. 9, in the U-V-W coordinate system, the first high-frequency voltage vector Vh1 and the second high-frequency voltage vector Vh2 make an angle with each other which is equal to the spatial phase difference Δθ between the first and second winding groups 10A and 10B. Consequently, the magnitude of the resultant vector of the first high-frequency voltage vector Vh1 and the second high-frequency voltage vector Vh2 becomes unequal to 0. Hence, according to the related art, it is impossible to reduce noise of the rotating electric machine 10 generated due to application of the high-frequency voltages as effectively as according to the present embodiment.

As described above, in the present embodiment, the first γ-axis high-frequency voltage Vγ1$h$ and the first δ-axis high-frequency voltage Vδ1$h$ are set by the reference high-frequency voltage setting unit 60 and the second γ-axis high-frequency voltage Vγ2$h$ and the second δ-axis high-frequency voltage Vδ2$h$ are set by the phase operating unit 61 so that in the U-V-W coordinate system, the magnitude of the resultant vector of the first high-frequency voltage vector Vh1 and the second high-frequency voltage vector Vh2, which are respectively applied to the first and second winding groups 10A and 10B, becomes smaller than the magnitude of each of the first high-frequency voltage vector Vh1 and the second high-frequency voltage vector Vh2. More particularly, in the present embodiment, the magnitude of the resultant vector of the first high-frequency voltage vector Vh1 and the second high-frequency voltage vector Vh2 becomes zero.

With the above configuration, it becomes possible to reliably and effectively reduce noise of the rotating electric machine 10 generated due to application of the high-frequency voltages Vγ1$h$, Vδ1$h$, Vγ2$h$ and Vδ2$h$ for estimation of the rotation angle of the rotating electric machine 10.

Moreover, in the present embodiment, the first γ-axis high-frequency voltage Vγ1$h$ and the first δ-axis high-frequency voltage Vδ1$h$ are first set by the reference high-frequency voltage setting unit 60. Then, the second γ-axis high-frequency voltage Vγ2$h$ and the second δ-axis high-frequency voltage Vδ2$h$ are set by the phase operating unit 61 by offsetting, based on the spatial phase difference Δθ between the first and second winding groups 10A and 10B, the phases of the first γ-axis high-frequency voltage Vγ1$h$ and the first δ-axis high-frequency voltage Vδ1$h$. More particularly, in the present embodiment, each of the second γ-axis high-frequency voltage Vγ2$h$ and the second δ-axis high-frequency voltage Vδ2$h$ set by the phase operating unit 61 has the same amplitude and frequency as a corresponding one of the first γ-axis high-frequency voltage Vγ1$h$ and the first δ-axis high-frequency voltage Vδ1$h$ set by the reference high-frequency voltage setting unit 60.

With the above configuration, it becomes possible to easily and suitably set the second γ-axis high-frequency voltage Vγ2$h$ and the second δ-axis high-frequency voltage Vδ2$h$.

Second Embodiment

Figure 10:
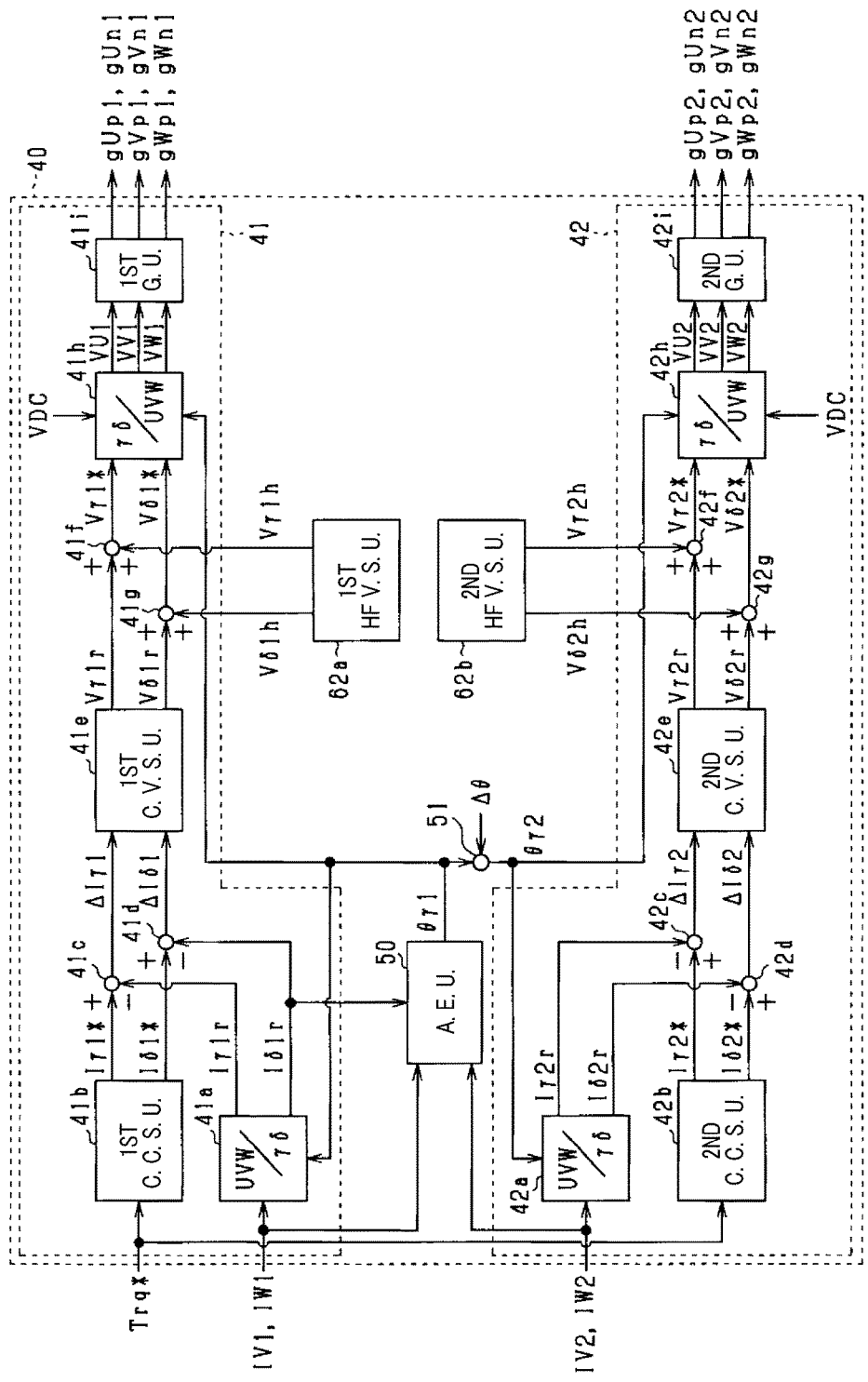
FIG. 10 is a block diagram illustrating the configuration of a control apparatus according to a second embodiment.

FIG. 10 shows the configuration of a control apparatus 40 according to a second embodiment.

The configuration of the control apparatus 40 according to the present embodiment is similar to the configuration of the control apparatus 40 according to the first embodiment (see FIG. 3). Accordingly, only the differences therebetween will be described hereinafter.

As shown in FIG. 10, in the present embodiment, the control apparatus 40 includes a first high-frequency voltage setting unit (abbreviated to 1ST HF V. S. U. in FIG. 10) 62$a$ and a second high-frequency voltage setting unit (abbreviated to 2ND HF V. S. U. in FIG. 10) 62$b$ instead of the reference high-frequency voltage setting unit 60 and the phase operating unit 61 described in the first embodiment.

The first high-frequency voltage setting unit 62$a$ is provided to set, during the torque control of the rotating electric machine 10, both the first γ-axis high-frequency voltage Vγ1$h$ and the first δ-axis high-frequency voltage Vδ1$h$. On the other hand, the second high-frequency voltage setting unit 62$b$ is provided to set, during the torque control of the rotating electric machine 10, both the second γ-axis high-frequency voltage Vγ2$h$ and the second δ-axis high-frequency voltage Vδ2$h$.

Figure 11:
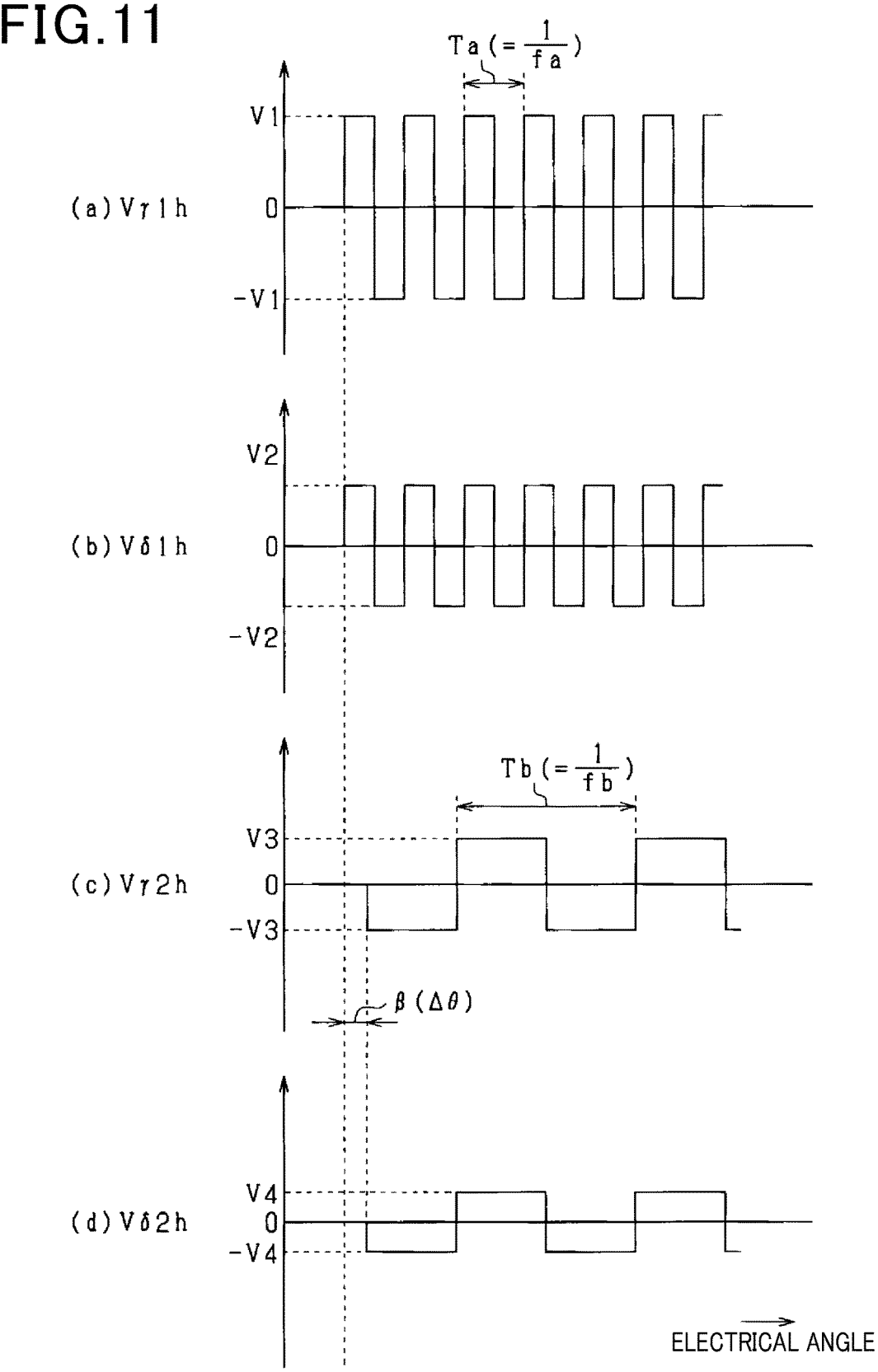
FIG. 11 is a waveform chart illustrating the waveforms of high-frequency voltages according to the second embodiment.

FIG. 11($a$) shows the first γ-axis high-frequency voltage Vγ1$h$ set by the first high-frequency voltage setting unit 62$a$. FIG. 11($b$) shows the first δ-axis high-frequency voltage Vδ1$h$ set by the first high-frequency voltage setting unit 62$a$.

As shown in FIG. 11($a$), the first γ-axis high-frequency voltage Vγ1$h$ is in the form of a rectangular-wave pulse signal whose amplitude is set to the first amplitude V1. On the other hand, as shown in FIG. 11($b$), the first δ-axis high-frequency voltage Vδ1$h$ is in the form of a rectangular-wave pulse signal whose amplitude is set to the second amplitude V2.

In the present embodiment, both the frequencies of the first γ-axis high-frequency voltage Vγ1h and the first δ-axis high-frequency voltage Vδ1h are set to fa. Moreover, the phases of the first γ-axis high-frequency voltage Vγ1h and the first δ-axis high-frequency voltage Vδ1h are set to be equal to each other. In addition, the first amplitude V1 and the second amplitude V2 may be set to be either equal to or different from each other.

FIG. 11(c) shows the second γ-axis high-frequency voltage Vγ2h set by the second high-frequency voltage setting unit 62b. FIG. 11(d) shows the second δ-axis high-frequency voltage Vδ2h set by the second high-frequency voltage setting unit 62b.

As shown in FIG. 11(c), the second γ-axis high-frequency voltage Vγ2h is in the form of a rectangular-wave pulse signal whose frequency is set to fb that is lower than the frequency fa of the first γ-axis high-frequency voltage Vγ1h. More particularly, in the present embodiment, the frequency fb of the second γ-axis high-frequency voltage Vγ2h is set to be ⅓ of the frequency fa of the first γ-axis high-frequency voltage Vγ1h. Moreover, as shown in FIG. 11(d), the second δ-axis high-frequency voltage Vδ2h is also in the form of a rectangular-wave pulse signal whose frequency is set to fb. Furthermore, the phrases of the second γ-axis high-frequency voltage Vγ2h and the second δ-axis high-frequency voltage Vδ2h are set to be equal to each other.

The amplitude of the second γ-axis high-frequency voltage Vγ2h is set to a third amplitude V3 that is smaller than the first amplitude V1 (i.e., the amplitude of the first γ-axis high-frequency voltage Vγ1h). The amplitude of the second δ-axis high-frequency voltage Vδ2h is set to a fourth amplitude V4 that is smaller than the second amplitude V2 (i.e., the amplitude of the first δ-axis high-frequency voltage Vδ1h).

The falling timing of the second γ-axis high-frequency voltage Vγ2h is offset from the rising timing of the first γ-axis high-frequency voltage Vγ1h by a predetermined angle β. The falling timing of the second δ-axis high-frequency voltage Vδ2h is also offset from the rising timing of the first δ-axis high-frequency voltage Vδ1h by the predetermined angle β. In addition, the angle β may be predetermined based on the spatial phase difference Δθ between the first and second winding groups 10A and 10B.

In the present embodiment, the frequencies fa of the first γ-axis high-frequency voltage Vγ1h and the first δ-axis high-frequency voltage Vδ1h are set to be different from the frequencies fb of the second γ-axis high-frequency voltage Vγ2h and the second δ-axis high-frequency voltage Vδ2h, so as to disperse the spectrum of noise generated due to application of the high-frequency voltages Vγ1h, Vδ1h, Vγ2h and Vδ2h. Consequently, it becomes possible to lower the peak value of the noise.

Moreover, in the present embodiment, the frequencies fb of the second γ-axis high-frequency voltage Vγ2h and the second δ-axis high-frequency voltage Vδ2h are set to be lower than the frequencies fa of the first γ-axis high-frequency voltage Vγ1h and the first δ-axis high-frequency voltage Vδ1h. However, the lower the frequencies fb of the second γ-axis high-frequency voltage Vγ2h and the second δ-axis high-frequency voltage Vδ2h, the higher the peak values of the high-frequency currents that flow in the second winding group 10B upon application of the second high-frequency voltage vector Vh2. Consequently, it may be difficult to effectively reduce the noise even with application of the first high-frequency voltage vector Vh1 to the first winding group 10A and application of the second high-frequency voltage vector Vh2 to the second winding group 10B.

Figure 12:
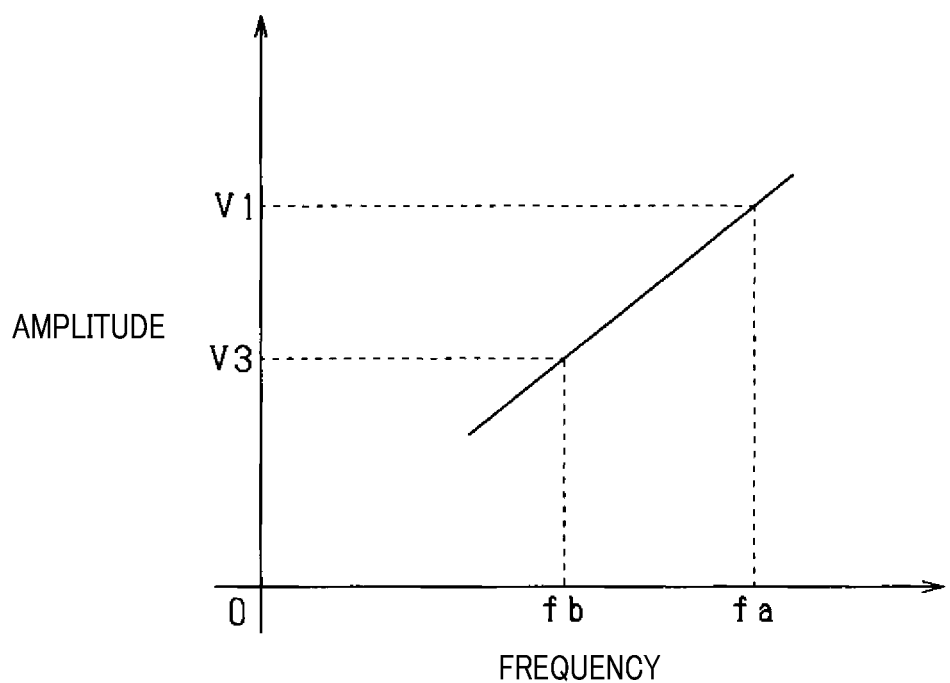
FIG. 12 is a schematic view illustrating the relationship between the frequencies and amplitudes of the high-frequency voltages according to the second embodiment.

In view of the above, in the present embodiment, as shown in FIG. 12, the lower the frequency fb of the second γ-axis high-frequency voltage Vγ2h with respect to the frequency fa of the first γ-axis high-frequency voltage Vγ1h, the smaller the amplitude of the second γ-axis high-frequency voltage Vγ2h (i.e., the third amplitude V3) is set with the respect to the amplitude of the first γ-axis high-frequency voltage Vγ1h (i.e., the first amplitude V1). Similarly, the lower the frequency fb of the second δ-axis high-frequency voltage Vδ2h with respect to the frequency fa of the first δ-axis high-frequency voltage Vδ1h, the smaller the amplitude of the second δ-axis high-frequency voltage Vδ2h (i.e., the fourth amplitude V4) is set with the respect to the amplitude of the first δ-axis high-frequency voltage Vδ1h (i.e., the second amplitude V2). Consequently, it becomes possible to lower the peak values of the high-frequency currents that flow in the second winding group 10B upon application of the second high-frequency voltage vector Vh2. As a result, it becomes possible to effectively reduce the noise.

In addition, the first to the fourth amplitudes V1-V4 may be set so that the peak values of the high-frequency currents that flow in the second winding group 10B upon application of the second high-frequency voltage vector Vh2 become equal to the peak values of the high-frequency currents that flow in the first winding group 10A upon application of the first high-frequency voltage vector Vh1.

Moreover, the frequencies of the high-frequency voltages Vγ1h, Vδ1h, Vγ2h and Vδ2h may be set to fixed values or be variable. Further, in the case where the frequencies of the high-frequency voltages Vγ1h, Vδ1h, Vγ2h and Vδ2h are variable, the third and fourth amplitudes V3 and V4 may be set based on the variable frequencies fb of the second γ-axis high-frequency voltage Vγ2h and the second δ-axis high-frequency voltage Vδ2h and according to the relationship between V3, V4 and fb as shown in FIG. 12.

While the above particular embodiments have been shown and described, it will be understood by those skilled in the art that various modifications, changes and improvements may be made without departing from the spirit of the present invention.

For example, in the above embodiments, the rotating electric machine 10 includes the first winding group 10A and the second winding group 10B. That is, the number of winding groups included in the rotating electric machine 10 is equal to 2. However, the number of winding groups included in the rotating electric machine 10 may be 3 or more.

Figure 13:
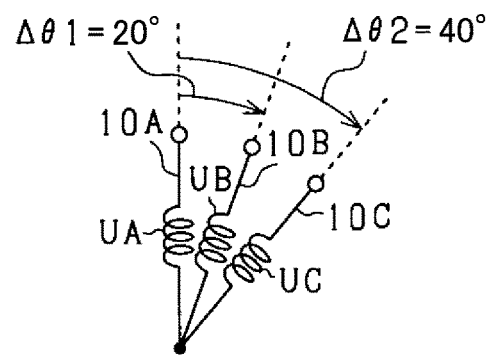
FIG. 13 is a schematic view illustrating the spatial phase differences between first, second and third winding groups according to a modification.

FIG. 13 illustrates an example where the rotating electric machine 10 includes a first winding group 10A, a second winding group 10B and a third winding group 10C. In addition, it should be noted that for the sake of simplicity, only the U-phase windings UA, UB and UC of the three winding groups 10A, 10B and 10C are shown in FIG. 13.

Specifically, in this example, as shown in FIG. 13, the first, second and third winding groups 10A, 10B and 10C are wound in the stator 13 so that: the spatial phase difference Δθ1 between the first and second winding groups 10A and 10B is equal to 20° in electrical angle; and the spatial phase difference Δθ2 between the first and third winding groups 10A and 10C is equal to 40° in electrical angle. That is, the spatial phase difference Δθ1 between the U-phase winding UA of the first winding group 10A and the U-phase winding UB of the second winding group 10B is equal to 20° in electrical angle; and the spatial phase difference Δθ2 between the U-phase winding UA of the first winding group 10A and the U-phase winding UC of the third winding group 10C is equal to 40° in electrical angle. In addition, in this example, the first winding group 10A corresponds to a "reference winding group" and the second and third winding groups 10B and 10C correspond to "remaining winding groups".

Figure 14:
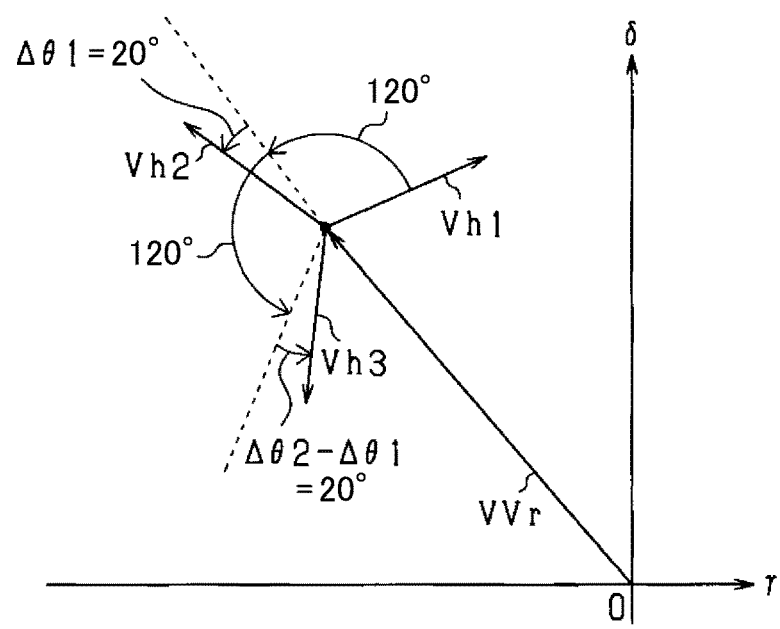
FIG. 14 is a vector diagram illustrating first, second and third high-frequency voltage vectors in the rotating coordinate system, the first, second and third high-frequency voltage vectors being respectively applied to the first, second and third winding groups according to the modification.

Furthermore, in this example, as shown in FIG. 14, a second high-frequency voltage vector Vh2 that is applied to the second winding group 10B is offset in phase from a first high-frequency voltage vector Vh1 that is applied to the first winding group 10A by (360°/N+Δθ1) (i.e., 140°) in electrical angle, where N represents the number of winding groups included in the rotating electric machine 10 and is equal to 3 in this example. Moreover, a third high-frequency voltage vector Vh3 that is applied to the third winding group 10C is offset in phase from the first high-frequency voltage vector Vh1 by (360°/N×2+Δθ2) (i.e., 280°) in electrical angle. In addition, it should be noted that FIG. 14 is merely a schematic diagram and does not accurately reflect the actual angles between the high-frequency voltage vectors Vh1, Vh2 and Vh3.

In the first embodiment, the high-frequency voltages Vγ1$h$ and Vδ1$h$ applied to the first winding group 10A and the high-frequency voltages Vγ2$h$ and Vδ2$h$ applied to the second winding group 10B are set so that in the U-V-W coordinate system, the magnitude of the resultant vector of the first and second high-frequency voltage vectors Vh1 and Vh2 becomes zero. However, the high-frequency voltages Vγ1$h$ and Vδ1$h$ applied to the first winding group 10A and the high-frequency voltages Vγ2$h$ and Vδ2$h$ applied to the second winding group 10B may also be set so that in the U-V-W coordinate system, the magnitude of the resultant vector of the first and second high-frequency voltage vectors Vh1 and Vh2 becomes smaller than the magnitude of each of the first and second high-frequency voltage vectors Vh1 and Vh2, but not equal to 0. In this case, in the γ-δ coordinate system, the first and second high-frequency voltage vectors Vh1 and Vh2 make an angle with each other which is close but not equal to (180°+Δθ). Consequently, in this case, it is still possible to reduce noise of the rotating electric machine 10 generated due to application of the high-frequency voltages Vγ1$h$, Vδ1$h$, Vγ2$h$ and Vδ2$h$.

In the above embodiments, each of the high-frequency voltages Vγ1$h$, Vδ1$h$, Vγ2$h$ and Vδ2$h$ is in the form of a rectangular-wave pulse signal. However, each of the high-frequency voltages Vγ1$h$, Vδ1$h$, Vγ2$h$ and Vδ2$h$ may alternatively be in the form of, for example, a sinusoidal signal.

In the above embodiments, the number of phases of the rotating electric machine 10 is three. However, the number of phases of the rotating electric machine 10 may alternatively be two, or four or more.

What is claimed is:

1. A rotation angle estimation apparatus for a rotating electric machine, the rotation angle estimation apparatus being applied to a system which includes the rotating electric machine and an electric power conversion circuit, the rotating electric machine including a stator having a plurality of winding groups wound therein, each of the winding groups being offset from another of the winding groups to have a spatial phase difference therebetween, the electric power conversion circuit being electrically connected with the winding groups to apply voltages to the winding groups, the rotation angle estimation apparatus comprising:

a high-frequency voltage setting unit that sets a plurality of high-frequency voltages which change at an angular velocity higher than an electrical angular velocity of the rotating electric machine;

a circuit operating unit that operates the electric power conversion circuit to apply each of the high-frequency voltages set by the high-frequency voltage setting unit to a corresponding one of the winding groups; and a rotation angle estimating unit that estimates a rotation angle of the rotating electric machine based on at least one of high-frequency currents that flow in the winding groups upon application of the high-frequency voltages to the winding groups, wherein the high-frequency voltage setting unit sets the high-frequency voltages based on the spatial phase difference between the winding groups so that in a fixed coordinate system of the rotating electric machine, the magnitude of a resultant vector of a plurality of high-frequency voltage vectors, which are respectively applied to the winding groups, becomes smaller than the magnitude of each of the high-frequency voltage vectors.

2. The rotation angle estimation apparatus as set forth in claim 1, wherein the winding groups comprise a reference winding group and at least one remaining winding group, the high-frequency voltage setting unit comprises:

a reference high-frequency voltage setting unit that sets the high-frequency voltages applied to the reference winding group; and a phase operating unit that sets the high-frequency voltages applied to the at least one remaining winding group by offsetting, based on the spatial phase difference between the reference winding group and the at least one remaining winding group, the phases of the high-frequency voltages set by the reference high-frequency voltage setting unit, and the circuit operating unit operates the electric power conversion circuit to apply the high-frequency voltages set by the reference high-frequency voltage setting unit to the reference winding group and the high-frequency voltages set by the phase operating unit to the at least one remaining winding group.

3. The rotation angle estimation apparatus as set forth in claim 2, wherein the phase operating unit sets the high-frequency voltages applied to the at least one remaining winding group by offsetting, based on the spatial phase difference between the reference winding group and the at least one remaining winding group and the quotient of one cycle in electrical angle of the rotating electric machine divided by the number of the winding groups, the phases of the high-frequency voltages set by the reference high-frequency voltage setting unit.

4. The rotation angle estimation apparatus as set forth in claim 2, wherein each of the high-frequency voltages set by the phase operating unit has the same amplitude and frequency as a corresponding one of the high-frequency voltages set by the reference high-frequency voltage setting unit.

5. The rotation angle estimation apparatus as set forth in claim 1, wherein the high-frequency voltage setting unit sets the high-frequency voltages based on the spatial phase difference between the winding groups so that in the fixed coordinate system, the magnitude of the resultant vector of the high-frequency voltage vectors becomes zero.

6. The rotation angle estimation apparatus as set forth in claim 1, wherein the winding groups comprise a reference winding group and at least one remaining winding group, the high-frequency voltage setting unit sets:
frequencies of the high-frequency voltages so that the frequencies of those of the high-frequency voltages which are applied to the reference winding group are higher than the frequencies of those of the high-frequency voltages which are applied to the at least one remaining winding group; and
amplitudes of the high-frequency voltages so that the lower the frequencies of those of the high-frequency voltages which are applied to the at least one remaining winding group with respect to the frequencies of those of the high-frequency voltages which are applied to the reference winding group, the smaller the amplitudes of those of the high-frequency voltages which are applied to the at least one remaining winding group with respect to the amplitudes of those of the high-frequency voltages which are applied to the reference winding group.

* * * * *